United States Patent
Smith

(10) Patent No.: US 9,272,340 B1
(45) Date of Patent: Mar. 1, 2016

(54) BLOWOUT PREVENTER MILLING ASSEMBLY

(71) Applicant: MERIDIAN EQUIPMENT, INC., Houston, TX (US)

(72) Inventor: Jeffery A. Smith, Houston, TX (US)

(73) Assignee: MERIDIAN EQUIPMENT, INC., Houston, TX (US)

( * ) Notice: Subject to any disclaimer, the term of this patent is extended or adjusted under 35 U.S.C. 154(b) by 0 days.

(21) Appl. No.: 14/659,886

(22) Filed: Mar. 17, 2015

Related U.S. Application Data

(60) Provisional application No. 62/059,750, filed on Oct. 3, 2014.

(51) Int. Cl.
 - *B23C 1/20* (2006.01)
 - *B23Q 9/02* (2006.01)
 - *B23C 3/00* (2006.01)

(Continued)

(52) U.S. Cl.
CPC ... *B23C 1/20* (2013.01); *B23C 1/06* (2013.01); *B23C 3/00* (2013.01); *B23P 6/00* (2013.01); *B23Q 3/186* (2013.01); *B23Q 9/0007* (2013.01); *B23Q 9/02* (2013.01); *B23Q 15/00* (2013.01); *B23Q 17/2233* (2013.01); *B23Q 1/626* (2013.01); *Y10T 29/49723* (2015.01); *Y10T 29/49725* (2015.01); *Y10T 409/304424* (2015.01); *Y10T 409/306384* (2015.01); *Y10T 409/306608* (2015.01)

(58) Field of Classification Search
CPC .............. B23C 1/06; B23C 1/20; B23C 3/00; B23Q 9/0007; Y10T 29/49719; Y10T 409/304424; Y10T 409/306384; Y10T 409/306496; Y10T 409/306552; Y10T 409/306608; Y10T 29/49723; Y10T 29/49725

USPC .......................... 409/143, 178, 180, 181, 182; 29/402.02, 402.04, 402.05
See application file for complete search history.

(56) References Cited

U.S. PATENT DOCUMENTS

| | | | | | |
|---|---|---|---|---|---|
| 2,293,745 | A | * | 8/1942 | Kruse | 33/642 |
| 4,102,245 | A | * | 7/1978 | Cousins | 409/194 |
| 5,608,962 | A | * | 3/1997 | Colligan et al. | 29/517 |
| 5,697,413 | A | * | 12/1997 | Fuller | 144/356 |
| 6,129,489 | A | * | 10/2000 | Linderholm | 409/178 |
| 6,382,889 | B1 | * | 5/2002 | Brown et al. | 409/175 |

(Continued)

FOREIGN PATENT DOCUMENTS

EP 1792673 A2 * 6/2007

*Primary Examiner* — Erica E Cadugan
*Assistant Examiner* — Michael Vitale
(74) *Attorney, Agent, or Firm* — Buskop Law Group, PC; Wendy Buskop

(57) ABSTRACT

A blowout preventer milling assembly for milling a gasket surface in a blowout preventer. The blowout preventer assembly can have legs, a support frame mounted to the legs, and a pair of support frame rails mounted to the support frame located on opposite sides of the gasket surface. The blowout preventer milling assembly can have a support frame actuator to move a bridge frame on support frame rails. The bridge frame can have bridge rails and a bridge frame actuator for moving a spindle holder on the bridge rails. A pneumatic spindle for calibrating and cutting the gasket surface is provided. A portable controller communicates through a network with the support frame actuator, the bridge frame actuator, a power supply, and a client device to control the movement of the pneumatic spindle to mill the gasket surface of the blowout preventer.

11 Claims, 10 Drawing Sheets

(51) Int. Cl.
  *B23P 6/00* (2006.01)
  *B23C 1/06* (2006.01)
  *B23Q 9/00* (2006.01)
  *B23Q 3/18* (2006.01)
  *B23Q 15/00* (2006.01)
  *B23Q 17/22* (2006.01)
  *B23Q 1/62* (2006.01)

(56) References Cited

U.S. PATENT DOCUMENTS

| | | | |
|---|---|---|---|
| 6,859,988 B2 * | 3/2005 | Lovchik et al. | 29/558 |
| 7,406,758 B2 * | 8/2008 | Jones et al. | 29/34 B |
| 2004/0265077 A1 * | 12/2004 | Boyl-Davis et al. | 408/1 R |
| 2013/0269411 A1 * | 10/2013 | Selman et al. | 73/1.07 |

* cited by examiner

FIGURE 8

| | |
|---|---|
| OPENING A BLOWOUT PREVENTER DOOR TO REVEAL A CHAMBER SURROUNDING A GASKET OF A BLOWOUT PREVENTER | 300 |
| INSERTING LEGS INTO GROOVES ON OPPOSITE SIDES OF THE GASKET | 302 |
| ATTACHING THE BLOWOUT PREVENTER MILLING ASSEMBLY TO THE LEGS | 304 |
| INSERTING A PNEUMATIC SPINDLE WITH A CALIBRATION HEAD INTO THE SPINDLE HOLDER ON THE BRIDGE FRAME | 306 |
| CONNECTING A SUPPORT FRAME ACTUATOR AND A BRIDGE FRAME ACTUATOR TO A PORTABLE CONTROLLER THAT IS CONNECTED TO A POWER A SUPPLY | 308 |
| LOCATING A GASKET SURFACE IN A BLOWOUT PREVENTER USING THE CALIBRATION HEAD AND PORTABLE CONTROLLER | 310 |
| OBTAINING A PRESET SIZE OF THE GASKET FOR THE PARTICULAR BLOWOUT PREVENTER FROM A LIBRARY OF GASKET SIZES IN THE PORTABLE CONTROLLER DATA STORAGE | 311 |
| USING COMPUTER INSTRUCTIONS IN THE PORTABLE CONTROLLER DATA STORAGE TO INSTRUCT THE PORTABLE CONTROLLER PROCESSOR TO ALIGN THE SPINDLE HOLDER TO THE CENTER OF THE GASKET SURFACE ON THE BLOWOUT PREVENTER | 312 |
| VERIFYING THAT THE GASKET SURFACE IS ALIGNED WITH THE SUPPORT FRAME RAILS USING AN INDICATOR ON THE CALIBRATION HEAD | 313 |
| REMOVING THE CALIBRATION HEAD AND PLACING A CUTTING HEAD ON THE PNEUMATIC SPINDLE, AND PLACING THE PNEUMATIC SPINDLE WITH CUTTING HEAD IN THE SPINDLE HOLDER | 314 |
| USING THE CUTTING HEAD AND PORTABLE CONTROLLER TO MILL THE GASKET SURFACE IN A BLOWOUT PREVENTER | 315 |
| DISENGAGING THE CUTTING HEAD FROM THE POWER SUPPLY AND REMOVING THE BLOWOUT PREVENTER MILLING ASSEMBLY | 316 |
| REMOVING THE LEGS | 317 |

FIGURE 10

| | |
|---|---|
| LIFTING A BLOWOUT PREVENTER WHILE SECURED TO CASINGS OR TUBULARS AND IN AN OPERATIONAL CONFIGURATION TO A DECK OR PLATFORM OF A RIG AT SEA | 2000 |
| LOCKING THE BLOWOUT PREVENTER TO THE DECK OR PLATFORM OF A RIG AT SEA | 2002 |
| OPENING DOORS OF A GASKET CHAMBER OF THE BLOWOUT PREVENTER EXPOSING A GASKET SURFACE | 2004 |
| SLIDING A PAIR OF LEGS INTO GROOVES IN THE GASKET CHAMBER | 2006 |
| ATTACHING A BLOWOUT PREVENTER MILLING ASSEMBLY TO THE PAIR OF LEGS USING A PLURALITY OF SPRING LOADED MOUNTING ASSEMBLIES | 2008 |
| INSERTING A PNEUMATIC SPINDLE WITH A CALIBRATION HEAD INTO A SPINDLE HOLDER OF THE BLOWOUT PREVENTER MILLING ASSEMBLY | 2010 |
| CONNECTING AT A SUPPORT FRAME ACTUATOR OF THE BLOWOUT PREVENTER MILLING ASSEMBLY TO A PORTABLE CONTROLLER, AND CONNECTING A BRIDGE FRAME ACTUATOR OF THE BLOWOUT PREVENTER MILLING ASSEMBLY TO THE PORTABLE CONTROLLER; ENABLING SIMULTANEOUS MOVEMENT ALONG AN X-AXIS AND Y-AXIS OF THE BLOWOUT PREVENTER MILLING ASSEMBLY | 2012 |
| CONNECTING THE PORTABLE CONTROLLER TO A POWER SUPPLY | 2014 |
| CALIBRATING A LOCATION OF THE PNEUMATIC SPINDLE OVER THE GASKET SURFACE USING THE PORTABLE CONTROLLER; THE PORTABLE CONTROLLER CONTROLLING X-AXIS AND Y-AXIS MOVEMENT SIMULTANEOUSLY BY BOTH ACTUATORS | 2016 |
| OBTAINING A PRESET SIZE OF THE GASKET SURFACE FROM A LIBRARY OF GASKET SIZES IN THE PORTABLE CONTROLLER DATA STORAGE | 2018 |
| REPLACING THE CALIBRATION HEAD OF THE PNEUMATIC SPINDLE AFTER CALIBRATION WITH A CUTTING HEAD | 2020 |
| CONNECTING THE PNEUMATIC SPINDLE WITH THE CUTTING HEAD TO A PNEUMATIC AIR SUPPLY | 2021 |
| ACTIVATING THE PNEUMATIC AIR SUPPLY TO PROVIDE PRESSURIZED AIR IN A RANGE OF 85 PSI TO 95 PSI TO THE PNEUMATIC SPINDLE WITH THE CUTTING HEAD | 2022 |
| AUTOMATICALLY REFINISHING THE GASKET SURFACE USING THE CUTTING HEAD BY SIMULTANEOUSLY MOVING THE SUPPORT FRAME ACTUATOR ALONG AN X-AXIS AND THE BRIDGE FRAME ACTUATOR ALONG A Y-AXIS, MOVING THE PNEUMATIC SPINDLE IN A PREDETERMINED PATTERN OVER THE GASKET SURFACE USING AN IDENTIFIED GASKET SIZE BI-DIRECTIONALLY | 2024 |
| DE-ENERGIZING THE PNEUMATIC AIR SUPPLY | 2026 |
| DISENGAGING THE PNEUMATIC SPINDLE WITH THE CUTTING HEAD FROM THE DE-ENERGIZED PNEUMATIC AIR SUPPLY | 2028 |
| REMOVING THE BLOW OUT PREVENTER MILLING ASSEMBLY FROM THE PAIR OF LEGS | 2030 |
| REMOVING THE PAIR OF LEGS FROM THE GROOVES OF THE BLOWOUT PREVENTER FORMING A REPAIRED BLOWOUT PREVENTER GASKET WHILE THE BLOWOUT PREVENTER IS IN OPERATIONAL CONFIGURATION AT SEA AND WHILE THE BLOW OUT PREVENTER IS IN LINE WITH CASING OR TUBULARS AND SECURED TO CASINGS OR TUBULARS OF A WELLBORE | 2032 |

BLOWOUT PREVENTER MILLING ASSEMBLY

CROSS REFERENCE TO RELATED APPLICATION

The current application claims priority to and the benefit of U.S. Provisional Patent Application Ser. No. 62/059,750 filed on Oct. 3, 2014, entitled "BLOWOUT PREVENTER MILLING ASSEMBLY". This reference is herein incorporated in its entirety.

FIELD

The embodiments generally relate to an automated blowout preventer milling assembly for milling gaskets in a blowout preventer.

BACKGROUND

A blowout preventer (BOP) is generally used to control sub surface pressures that may adversely affect equipment used in drilling oil and gas wells. Fluid pressure in a wellbore can rise suddenly. A sudden rise in pressure can be controlled by adding dense drilling mud into the well; however, this takes time. When a sudden rise in pressure is observed, a blowout preventer is activated to prevent fluid from the well escaping uncontrollably. Blowout preventers are usually situated at the wellhead and can be connected at the top of a riser, at rig level, in coiled tubing injector modules, and blowout preventers arranged in certain top drive systems. The wellhead is connected to casing lining the oil or gas well or to a template at the earth's surface. A concentric pipe, such as drill pipe, production tubular, coiled tubing or tool string can run through the blowout preventer and casing.

A commonly used blowout preventer has a main body having a through bore. The main body is connected inline at the wellhead and the through bore forms part of the main flow channel for the fluids passing through the casing and thus has the same or similar internal diameter as that of the casing. The main body is provided with a pair of opposing ram actuators arranged perpendicular to the flow of fluid through the through bore. The ram actuators are provided with a ram block on the end of each ram actuator for carrying out specific purposes. There are many types of blowout preventers for carrying out these specific purposes, which can include, but are not limited to: pipe ram type, blind ram type, shear ram type and multi-ram type.

Due to numerous faults of blowout preventers, especially in the Gulf of Mexico, new federal guidelines have been established regarding the specifications of blowout preventers. In order to refit blowout preventers that may not meet these new federal guidelines, the well has to be shut down and the blowout preventers brought to the surface in order to retrofit or re-mill these blowout preventers.

A need exists for an assembly that can retrofit or re-mill blowout preventers while minimizing the amount of time the well needs to be shut down.

The present embodiments meet these needs.

BRIEF DESCRIPTION OF THE DRAWINGS

The detailed description will be better understood in conjunction with the accompanying drawings as follows:

FIG. 8 depicts an embodiment for using the blowout preventer milling assembly.

FIG. 10 depicts a diagram of another embodiment for using the blowout preventer milling assembly.

Figure 1:
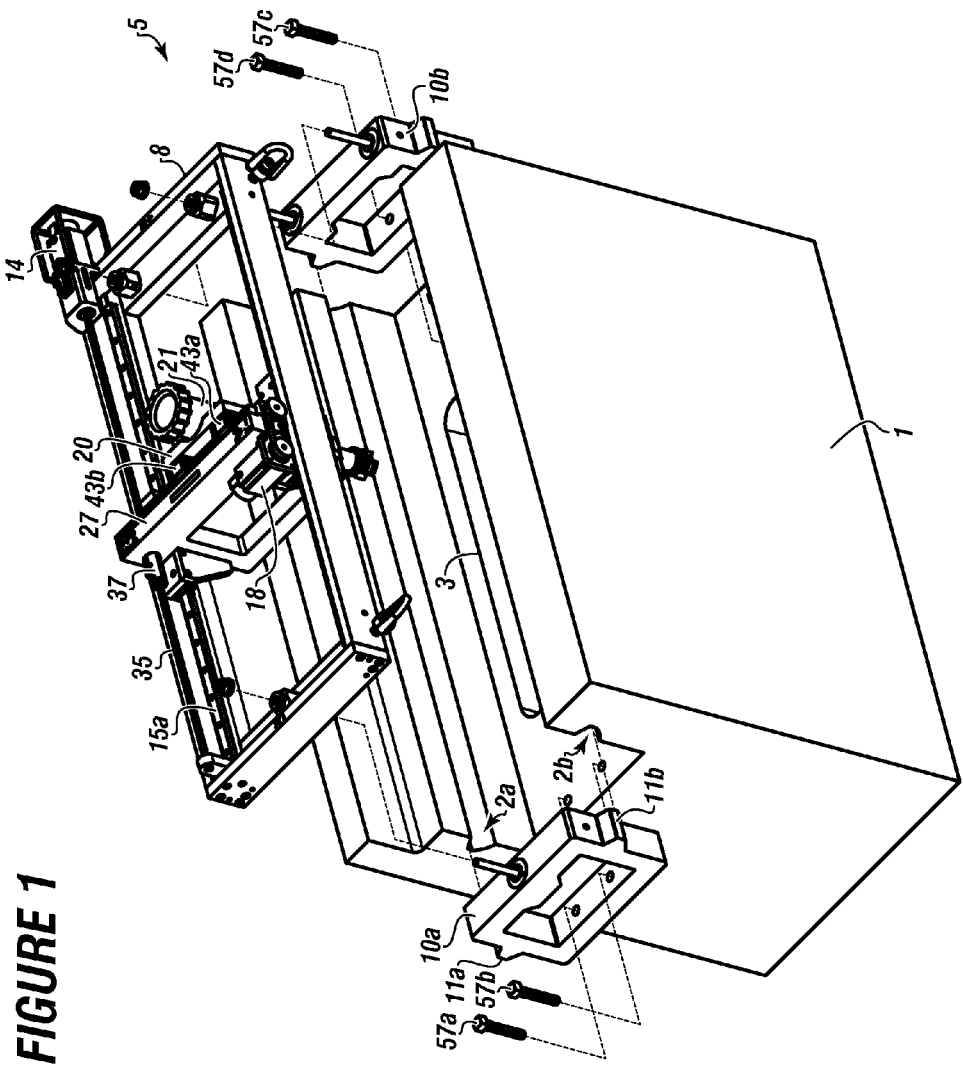
FIG. 1 depicts an exploded view of an embodiment of the blowout preventer milling assembly.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments save power by allowing blowout preventer gasket surface refinishing to be done at sea instead of transporting the blowout preventer to and from shore.

The present embodiments can save lives by allowing a remote operator located miles from a site to do the gasket refinishing on the blowout preventer.

The embodiments relate to a blowout preventer milling assembly for milling a gasket surface in a blowout preventer.

The blowout preventer milling assembly can have a pair of legs insertable in pre-existing grooves on a blowout preventer.

A support frame can be secured to the pair of legs.

A pair of support frame rails can be mounted to the support frame. The support frame rails can be mounted so that each rail can be on an opposite side of the gasket surface and the support frame rails can be mounted in parallel to one another.

A pair of bearings can be mounted to each support frame rail. A carriage plate can be mounted to each pair of bearings.

A support frame actuator, such as a linear actuator with a ball screw, can be mounted so that the ball screw can be parallel to the support frame rails. A ball nut can be secured to the opposite side of the support frame actuator. The support frame actuator can move the first and second carriage plates along the support frame rails along an x-axis of the support frame.

A bridge frame can be secured to the carriage plates. A pair of bridge rails can be attached to a first side of the bridge frame. The bridge rails can be mounted in parallel to each other. A bridge carriage plate can be mounted on top of the bridge rails. A spindle holder and a bridge frame actuator can be mounted to the bridge carriage plate.

The bridge frame actuator can be a second linear actuator with a ball screw and ball nut for linearly moving the spindle holder bi-directionally on the bridge rails at a 90 degree angle to the support frame rails.

A pneumatic spindle can be inserted into the spindle holder. The pneumatic spindle can have two different heads, such as a calibration head and a cutting head. In embodiments, the calibration head and the cutting head can be removable.

The pneumatic spindle can be connected to a pneumatic air supply.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "network" refers to a satellite network, cellular network, internet network, a peer to peer network, a local area network, a wide area network, another global communication network, or combinations of these networks.

A portable controller with a processor, data storage and display can be used to communicate both signals and power to the two actuators providing precise movement of the spindle holder over the gasket surface. The portable controller can be in an impact proof, water proof plastic or rubberized housing. The portable controller can send movement signals to and receive signals, such as bi-directionally, from the support frame actuator and bridge frame actuator. The portable controller can receive power from a power supply and transfer the power, such as using a rectifier or a transformer, to each of the actuators. The portable controller processor can communicate with a network that can communicate to a client device. The portable controller itself can control the movement of the actuators to move the spindle accurately over the gasket surface to mill the gasket surface of the blowout preventer.

The client device via the network can instruct the portable controller to control the movement of the actuators and move the spindle accurately over the gasket surface to mill the gasket surface of the blowout preventer.

The processor can be a computer, a programmable logic circuit, or another similar processor. The display can be an interactive touch display, such as a smart phone or tablet computer.

Turning now to the Figures, FIG. 1 depicts an exploded view of an embodiment of the blowout preventer milling assembly 5 positioned over a gasket surface 3 of a blowout preventer 1.

The blowout preventer milling assembly 5 can have a first leg 10a and a second leg 10b, which herein can be referred to as the pair of legs. Each leg can be generally square in shape with an extension that allows each leg to slide into both first groove 2a and second groove 2b in the blowout preventer 1 using an extension 11a and 11b on each leg.

A support frame 8 can be mounted to both of the first leg 10a and the second leg 10b. The support frame 8 can extend away from the pair of legs and extend away from the blowout preventer 1 above the gasket surface 3.

The support frame 8 can include a pair of support frame rails mounted in parallel to the support frame 8. A first support frame rail 15a is shown in this Figure.

The support frame 8 can include a support frame actuator 14. The support frame actuator 14 can cause a bridge frame 27 to travel along the parallel support frame rails on an x-axis. The support frame actuator 14 can be a linear actuator with a ball screw 35 and a ball nut 37. The ball nut 37 can be secured to the bridge frame 27.

The bridge frame 27 can support a bridge frame actuator 18 to move a spindle holder 20 on a y-axis while the support frame 8 moves the bridge fame on the aforementioned x-axis. In embodiments, the bridge frame actuator 18 can be a linear actuator with a ball screw and ball nut, similar to, but shorter in length than the support frame actuator 14.

A pneumatic spindle 21 can be mounted to the spindle holder 20 and connected to a pneumatic air supply for both calibration and cutting.

In embodiments, the support frame 8 can be from 30 inches to 50 inches long by 12 inches to 24 inches.

In embodiments, the bridge frame 27 can be from 12 inches to 24 inches long and 2 inches to 6 inches wide.

The support frame 8 can be made from cast iron. The bridge frame 27 can be made from aluminum.

The voltage to operate the actuators can be from a 110 volt power supply.

A plurality of jack screws 57a-57d can be used. At least two jack screws 57a and 57b can be used to secure each leg to the blowout preventer once the legs are installed in the grooves.

A first bridge bearing 43a and a second bridge bearing 43b can be used to support the spindle holder 20.

Figure 2:
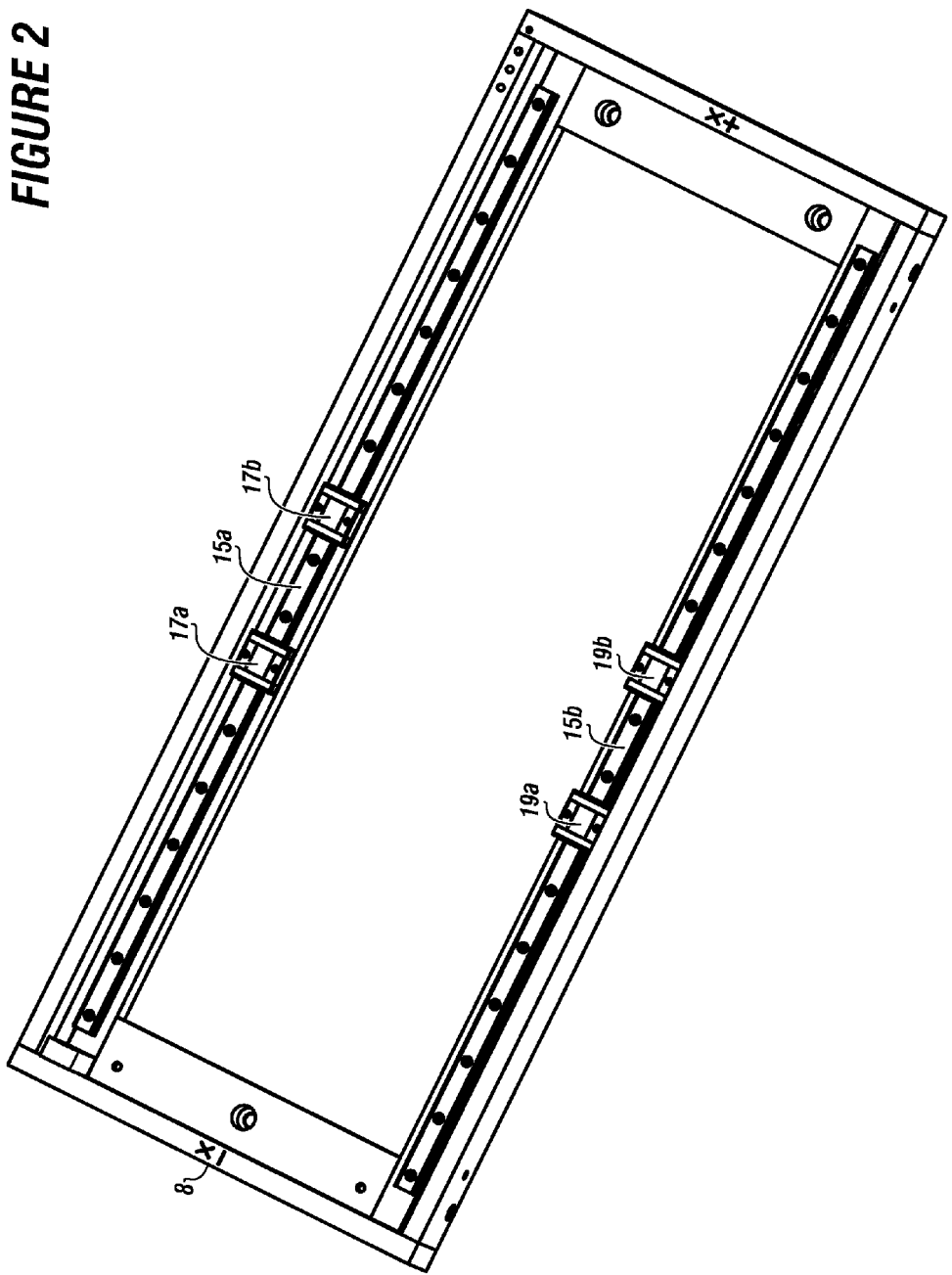
FIG. 2 depicts a detailed isometric view of a support frame.

FIG. 2 depicts a detailed isometric view of the support frame.

The support frame 8 is shown with the first support frame rail 15a and the second support frame rail 15b.

A plurality of first support frame bearings 17a and 17b can be mounted to the first support frame rail 15a.

A plurality of second support frame bearings 19a and 19b can be mounted to the second support frame rail 15b.

The bridge frame can be mounted over the plurality of first support frame bearings 17a and 17b and the plurality of second support frame bearings 19a and 19b enabling the bridge frame to slide on the first support frame rail 15a and the second support frame rail 15b.

Figure 3:
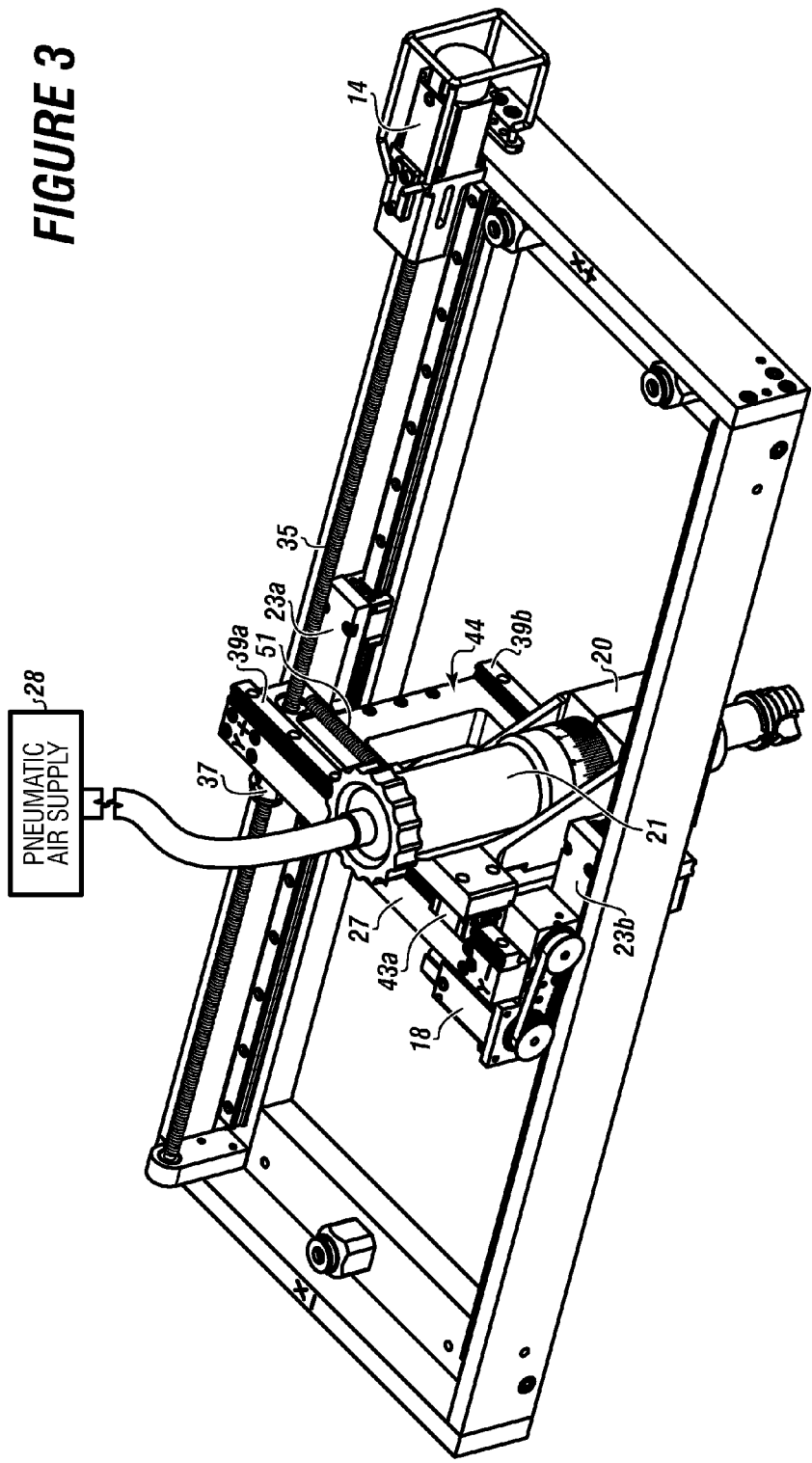
FIG. 3 depicts an isometric view of a support frame with a bridge frame.

FIG. 3 depicts an isometric view of a support frame with a bridge frame.

The support frame actuator 14 can move the bridge frame 27 along the first support frame rail and the second support frame rail with a ball screw 35 that connects to a ball nut 37.

A first carriage plate 23a is shown riding on the first support frame rail while a second carriage plate 23b rides on the second support frame rail.

The bridge frame 27 can have a first bridge rail 39a and a second bridge rail 39b, both which can be mounted to a first side 44 of the bridge frame 27.

The first bridge rail 39a and second bridge rail 39b can be mounted in parallel to each other like the first support frame rail and second support frame rail.

In embodiments, the first bridge rail 39a and second bridge rail 39b can run the width of the bridge frame 27. The bridge frame 27 can have additional bridge rails in order to support the bridge frame 27. The second bridge rail 39b can also be used to support the spindle holder 20.

The first bridge rail 39a and the second bridge rail 39b can be from 12 inches to 24 inches in length. The bridge rails can be made from carbon steel. The first bridge rail 39a and the second bridge rail 39b can be attached to the bridge frame 27 with fasteners, such as bolts and screws.

A bridge frame actuator 18 can be mounted to the bridge frame 27. The bridge frame actuator 18 can move the spindle holder 20 along the first bridge rail 39a and the second bridge rail 39b at a 90 degree angle to the direction the support frame actuator 14 moves the bridge frame 27 on the first and second support frame rails, which is along a y-axis.

The spindle holder 20 can be connected to a pneumatic air supply 28.

The first carriage plate 23a can be mounted over the plurality of first support bearings 17a and 17b for slidably engaging the first support frame rail.

The second carriage plate 23b can be mounted over the plurality of second support bearings 19a and 19b for slidably engaging the second support frame rail.

The support frame actuator 14 can move the two carriage plates 23a and 23b along the support frame in a linear motion in parallel. Any actuator means that can move the weight of the bridge frame can be used, particularly actuators that are usable in the deep sea without failing, such as in 5,000 feet of water.

The first bridge bearing 43a and the second bridge bearing can be used to support the spindle holder 20.

In embodiments, the ball screw 35 can penetrate the ball nut 37 secured to the bridge frame 27, thereby allowing the bridge frame 27 to move on simultaneously on the support frame rails perpendicular to movement of the spindle holder 20 on the bridge rails.

In embodiments, the bridge frame actuator 18 can be a linear actuator that uses a bridge ball screw 51 parallel to the bridge rails. The bridge ball screw 51 can penetrate a bridge ball nut secured to the spindle holder 20, thereby allowing the spindle holder 20 to move on the bridge rail perpendicular to the support frame rails.

A pneumatic spindle 21 is also shown.

Figure 4:
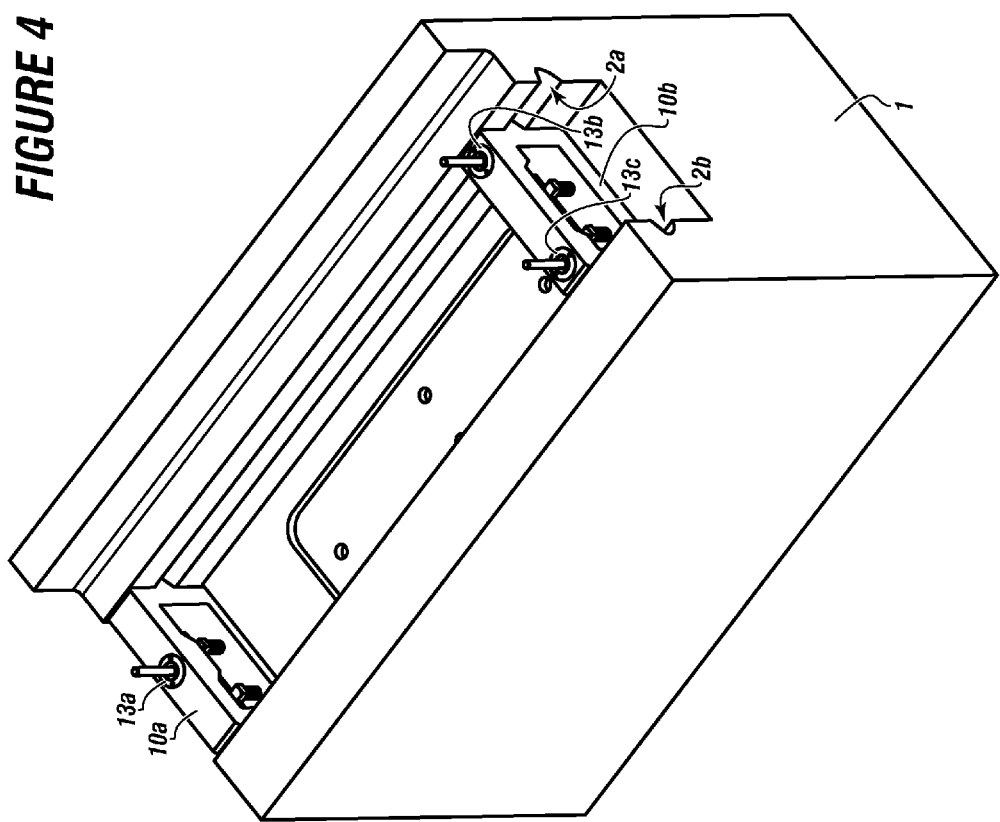
FIG. 4 depicts an isometric view of the legs installed in the grooves of the blowout preventer with spring loaded mounting assemblies.

FIG. 4 depicts an isometric view of the first leg 10a and second leg 10b installed in the first groove 2a and the second groove 2b of the blowout preventer 1.

Spring loaded mounting assemblies 13a, 13b, and 13c can be used to hold the legs into the blowout preventer 1.

Each spring loaded mounting assembly 13a-13c can include a threaded rod, a die spring surrounding the threaded rod, an adjustment screw cap mounted to the threaded rod, a flange nut mounted to the threaded rod, a washer, a holding jig connected to the threaded rod, and an adjustment screw mounted to the support frame.

The legs can be carbon steel legs from 3 inches to 5 inches in thickness. The first leg 10a and the second leg 10b can be mounted adjustably and movably in the first and second grooves 2a and 2b. The legs can be from 9 inches and 14 inches in height.

Figure 5:
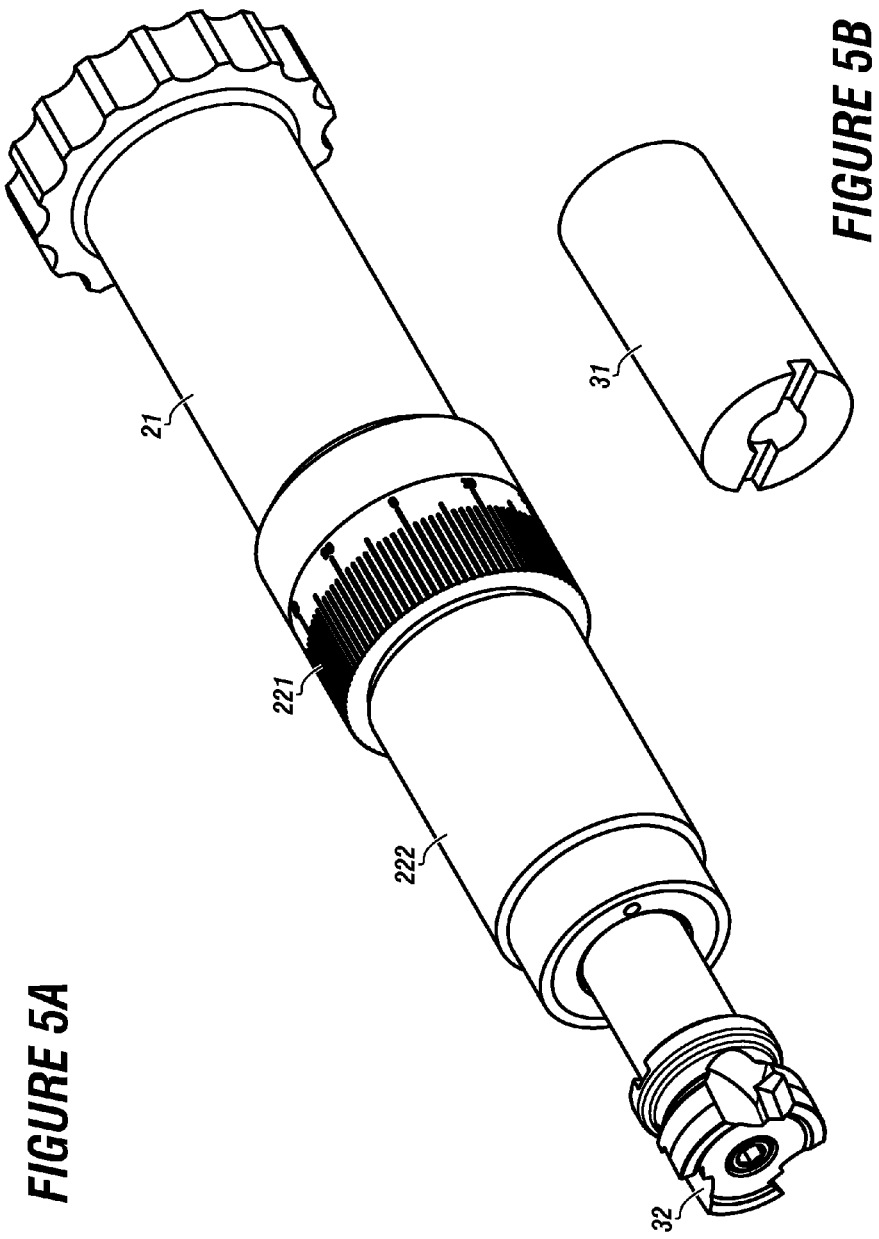
FIG. 5A depicts an isometric view of an embodiment of a pneumatic spindle.
FIG. 5B depicts an isometric view of an embodiment of a calibration head for use with the pneumatic spindle.

FIG. 5A depicts an isometric view of an embodiment of a pneumatic spindle.

The pneumatic spindle 21 can have a cutting head 32. In embodiments, the cutting head 32 can be a fly cutter. The pneumatic spindle 21 can be removably mounted in the spindle holder.

The cutting head can be purchased from Meridian Equipment, Inc. of Houston, Tex.

The pneumatic spindle can use a threaded body 222 to receive the cutting head 32 and a graduated rotatable dial 221.

FIG. 5B depicts an isometric view of an embodiment of a calibration head for use with the pneumatic spindle.

A calibration head 31, which can be an anodized aluminum calibration head, can engage the threaded body with a graduated rotatable dial. The calibration head 31 can be installed to the threaded body or the calibration head can be removed from the threaded body and the cutting head can be installed, creating a versatile spindle.

Figure 6:
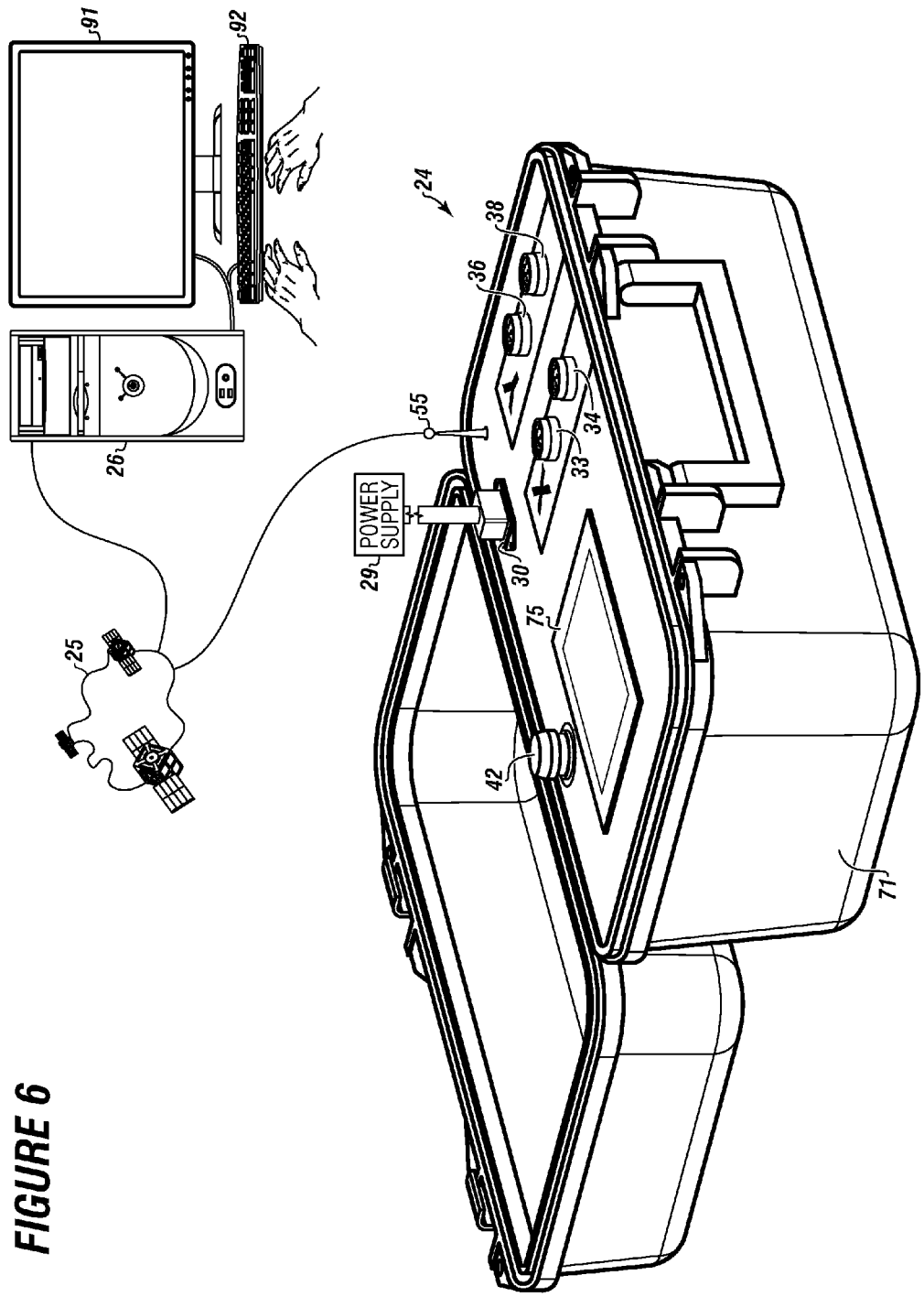
FIG. 6 depicts an embodiment of the portable controller connected to a network for communication with a client device.

FIG. 6 depicts an embodiment of the portable controller 24 connected to a network 25 for communication with a client device 26.

The client device 26 can have a client device processor connected to a client device display 91 and a client device input device 92, such as a keyboard. The client device 26 can be a laptop, a computer, a cellular phone, a smart phone, a tablet computer, or another remote processing device with bidirectional communication for communicating with the portable controller 24.

The network 25 can be a local area network, a wide area network, the internet, a cellular network, peer to peer network, satellite network, another global communication network, such as the internet, combinations thereof, or other type of networks capable of bi-directional communication.

The portable controller 24 can be encased in a closable housing 71. The closable housing can be plastic or a rubberized plastic, impact resistant, and water proof when closed.

The portable controller 24 can include a power supply inlet 30 formed on a face plate in the closable housing 71. The power can be 110 volt or 220 volt AC power. In embodiments, the power can be input into the portable controller and can be passed through an AC/DC converter for changing the AC power to DC power prior to operating the actuators on the frames. In embodiment the portable controller can receive DC power from onboard batteries. The actuators can be operated from 12 volts to 29 volts.

For controlling the x-axis movement of the pneumatic spindle with the calibration head or the cutting head, the portable controller can transmit commands from a processor with a portable controller display 75 mounted to the face plate to a support frame actuator output 34.

In embodiments the pneumatic spindle can be operated at a pressure from 60 psi to 120 psi.

A cable can connect between the support frame actuator output 34 transmitting commands to the support frame actuator.

The support frame actuator can communicate to the portable controller via a support frame actuator input 33.

A cable can connect from a power supply 29 via the power supply inlet 30 to the portable controller 24.

The portable controller 24 can also be in communication with the bridge frame actuator.

The portable controller 24 can have a bridge frame actuator input 36 for receiving signals from the bridge frame actuator for storage in a data storage connected to the portable controller processor.

For controlling the x-axis movement of the spindle with the calibration head or the cutting head, the portable controller can use a bridge frame actuator output 38 for transmitting commands and power to the bridge frame actuator.

The portable controller 24 can have an internet connection 55 allowing the processor of the portable controller to communicate with the network 25, the internet or another network.

The portable controller display 75 can be configured as a touch screen, acting as both an input device and a display device, much like a tablet computer.

The portable controller 24 can have an emergency stop button 42 to terminate power to the actuators and pneumatic spindle with either the cutting head or calibration head.

An AC/DC converter can be in the portable controller to provide power from a source to the actuators.

Figure 7:
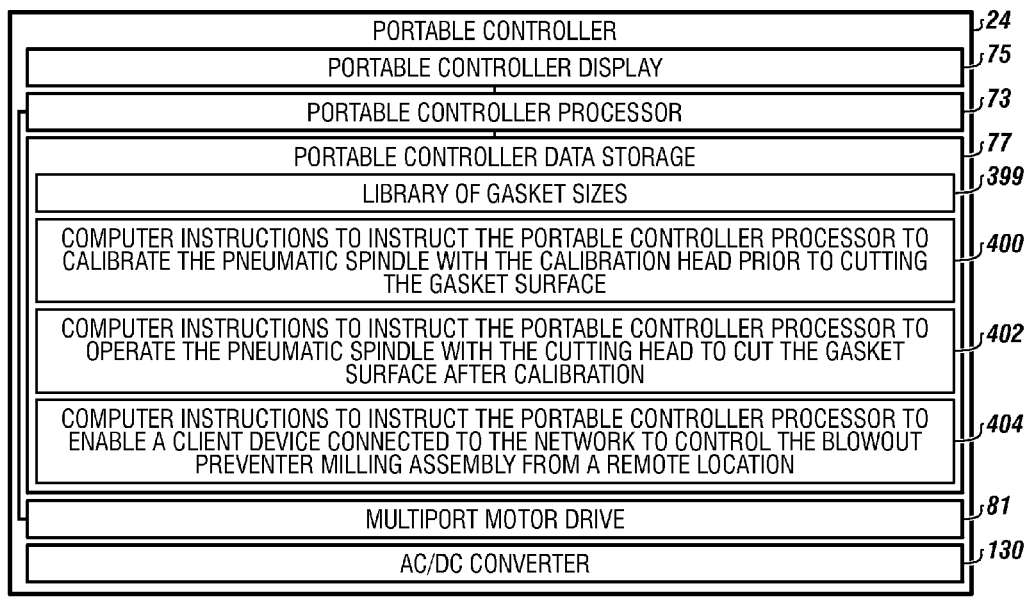
FIG. 7 depicts a diagram of a portable controller.

FIG. 7 depicts a diagram of the portable controller 24.

The portable controller 24 can include the portable controller display 75, a portable controller processor 73, a portable controller data storage 77, and a multiport motor drive 81. A usable multiport motor drive can be an ACS motion control made by Minarick Automation and Control of Houston Tex.

The portable controller processor 73 can be connected to the portable controller display 75, and the portable controller data storage 77. The portable controller processor 73 can be used to execute computer instructions in the portable controller data storage.

The portable controller data storage 77 can include a library of gasket sizes 399.

Gasket sizes can differ depending on the type of blowout preventer. For example, a blowout preventer gasket size can be from 8 inches to 12 inches wide and from 24 inches to 40 inches long.

The portable controller data storage 77 can include computer instructions 400 to instruct the portable controller processor to calibrate the pneumatic spindle with the calibration head prior to cutting the gasket surface.

The portable controller data storage 77 can include computer instructions 402 to instruct the portable controller processor to operate the pneumatic spindle with the cutting head to cut the gasket surface after calibration.

The portable controller data storage 77 can include computer instructions 404 to instruct the portable controller processor to enable a client device connected to the network to control the blowout preventer milling assembly from a remote location.

An AC/DC converter 130 can be in the portable controller to provide power from a source to the actuators.

FIG. 8 depicts an embodiment for using the blowout preventer milling assembly.

The blowout preventer milling assembly can include opening a blowout preventer door to reveal a chamber surrounding a gasket of a blowout preventer, as step 300.

The blowout preventer milling assembly can include inserting legs into grooves on opposite sides of the gasket, as step 302.

The blowout preventer milling assembly can include attaching the blowout preventer milling assembly to the legs, as step 304. In embodiments, spring loaded mounting assemblies can be used.

The blowout preventer milling assembly can include inserting a pneumatic spindle with a calibration head into the spindle holder on the bridge frame, as step 306.

The blowout preventer milling assembly can include connecting a support frame actuator and a bridge frame actuator to a portable controller that can be connected to a power supply, as step 308.

The blowout preventer milling assembly can include locating a gasket surface in a blowout preventer using the calibration head and portable controller, as step 310.

The blowout preventer milling assembly can include obtaining a preset size of the gasket for the particular blowout preventer from a library of gasket sizes in the portable controller data storage, as step 311.

The blowout preventer milling assembly can include using computer instructions in the portable controller data storage to instruct the portable controller processor to align the spindle holder to the center of the gasket surface on the blowout preventer, as step 312.

The blowout preventer milling assembly can include verifying that the gasket surface can be aligned with the support frame rails using an indicator on the calibration head, as step 313.

The blowout preventer milling assembly can include removing the calibration head and placing a cutting head on the pneumatic spindle, and placing the pneumatic spindle with cutting head in the spindle holder, as step 314. The cutting head can be connected to a pneumatic power supply, such as a pneumatic air supply.

The blowout preventer milling assembly can include using the cutting head and the portable controller to mill the gasket surface in a blowout preventer, as step 315. The milling can be done automatically, or by remote control using a client device connected to a network, wherein the client device can be remote from the cutting head.

The blowout preventer milling assembly can include disengaging the cutting head from the power supply and removing the blowout preventer milling assembly, as step 316.

The blowout preventer milling assembly can include removing the legs, as step 317.

Figures 9A, 9B:
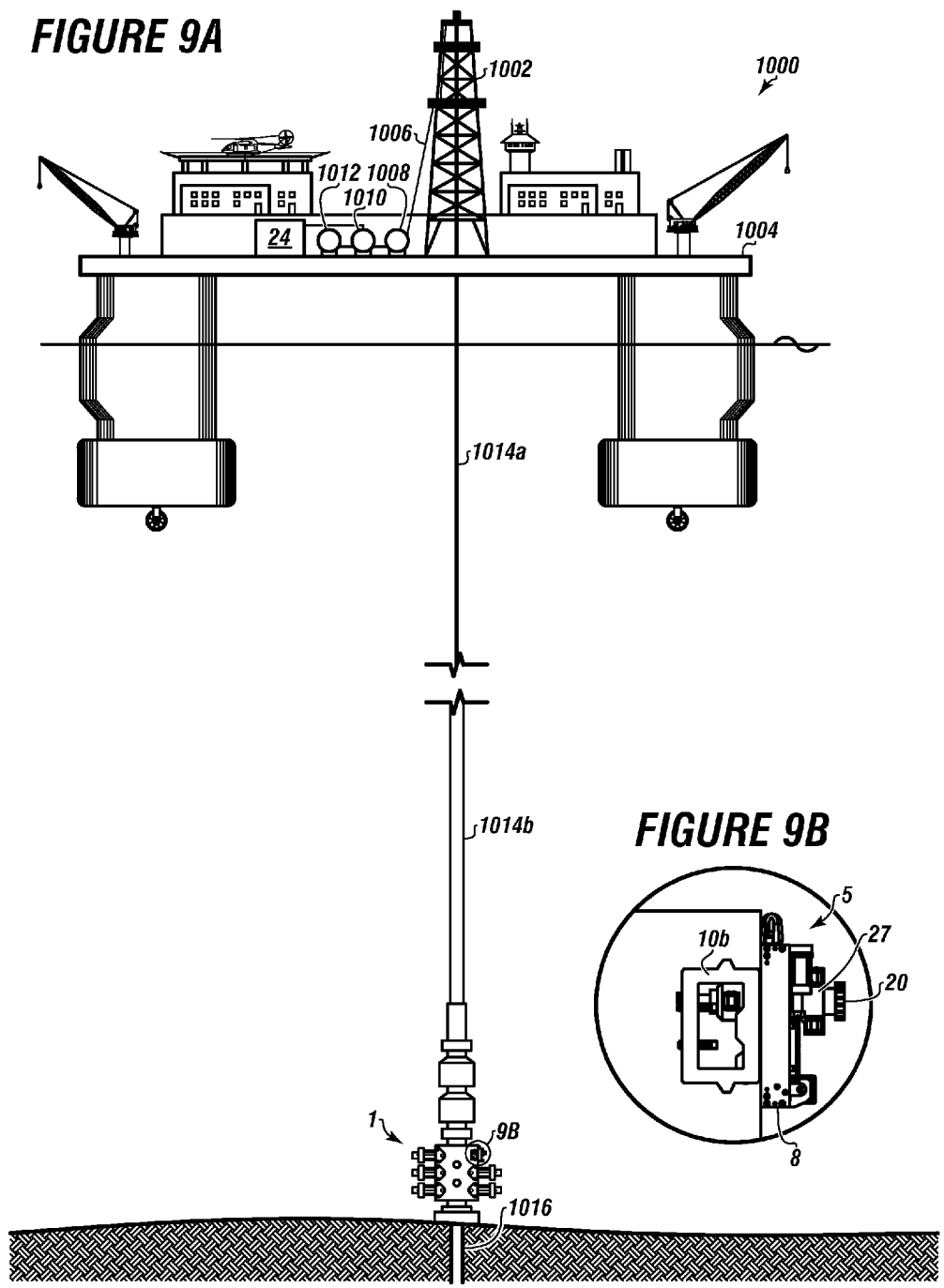
FIG. 9A depicts a rig usable with the blowout preventer milling assembly.
FIG. 9B depicts a detail of the blowout preventer milling assembly installed on a blowout preventer.

FIG. 9A depicts a rig usable with the blowout preventer milling assembly.

The rig can be a production rig for use in processing with hydrocarbons from a subsea well, a drilling rig for drilling for hydrocarbons from a subsea wellbore, or similar rig usable with the invention.

The rig 1000 can include a derrick 1002 on a platform 1004.

The platform 1004 is shown as a floating semi-submersible. In other embodiments, the platform 1004 can be a spar, a tension leg platform, a jack up platform, a drill ship, or another floating vessel.

A hoist 1006 can be mounted to the derrick 1002. The derrick 1002 can also be a tower. In embodiments, the derrick 1002 can be a plurality of towers mounted to the platform. The hoist 1006 can include a hook with traveling block rolling over sheaves on the crown of the derrick 1002 or tower.

A drawworks 1008 can be connected to the hoist 1006. A generator 1010 with a fuel supply 1012 can be mounted to the platform 1004. The generator 1010 can operate the drawworks 1008 and hoist 1006.

The portable controller 24 can rest on the deck of the platform 1004 and can be connected to the generator 1010.

Tubulars 1014a and 1014b are shown extending from the platform to a wellbore 1016. In embodiments, the tubulars 1014a and 1014b can be casing. The blowout preventer 1 can be mounted to the tubular 1014b.

FIG. 9B shows a detail of the blowout preventer milling assembly 5 installed on the blowout preventer.

The second leg 10b is shown installed in the grooves of the blowout preventer.

The support frame 8 along with the spindle holder 20 is shown mounted to the bridge frame 27.

FIG. 10 shows an embodiment for repairing a blowout preventer while in an operational configuration at sea using the blowout preventer milling assembly.

Step 2000 involves lifting a blowout preventer while secured to casings or tubulars and in an operational configuration to a deck or platform of a rig at sea.

Step 2002 involves locking the blowout preventer to the deck or platform of a rig at sea.

Step 2004 involves opening doors of a gasket chamber of the blowout preventer exposing a gasket surface.

Step 2006 involves sliding a pair of legs into grooves in the gasket chamber.

Step 2008 involves attaching a blowout preventer milling assembly to the pair of legs using a plurality of spring loaded mounting assemblies.

Step 2010 involves inserting a pneumatic spindle with a calibration head into a spindle holder of the blowout preventer milling assembly.

Step 2012 involves connecting at a support frame actuator of the blowout preventer milling assembly to a portable controller, and connecting a bridge frame actuator of the blowout preventer milling assembly to the portable controller; enabling simultaneous movement along an x-axis and y-axis of the blowout preventer milling assembly.

Step 2014 involves connecting the portable controller to a power supply.

Step 2016 involves calibrating a location of the pneumatic spindle over the gasket surface using the portable controller;

the portable controller controlling x-axis and y-axis movement simultaneously by both actuators.

Step 2018 involves obtaining a preset size of the gasket surface from a library of gasket sizes in the portable controller data storage.

Step 2020 involves replacing the calibration head of the pneumatic spindle after calibration with a cutting head.

Step 2020 involves connecting the pneumatic spindle with the cutting head to a pneumatic air supply.

Step 2022 involves activating the pneumatic air supply to provide pressurized air in a range of 85 psi to 95 psi to the pneumatic spindle with the cutting head.

Step 2024 involves automatically refinishing the gasket surface using the cutting head by simultaneously moving the support frame actuator along an x-axis and the bridge frame actuator along a y-axis, moving the pneumatic spindle in a predetermined pattern over the gasket surface using an identified gasket size bi-directionally.

Step 2026 involves de-energizing the pneumatic air supply.

Step 2028 involves disengaging the pneumatic spindle with the cutting head from the de-energized pneumatic air supply.

Step 2030 involves removing the blowout preventer milling assembly from the pair of legs.

Step 2032 involves removing the pair of legs from the grooves of the blowout preventer forming a repaired blowout preventer gasket while the blowout preventer is in operational configuration at sea and while the blowout preventer is in line with casing or tubulars and secured to casings or tubulars of a wellbore.

While these embodiments have been described with emphasis on the embodiments, it should be understood that within the scope of the appended claims, the embodiments might be practiced other than as specifically described herein.

What is claimed is:

1. A blowout preventer milling assembly for milling a gasket surface in a blowout preventer, the blowout preventer milling assembly comprising:
    a. a first leg and a second leg, wherein each leg is removably connected in a first groove and a second groove of the blowout preventer, wherein each groove is on an opposite side of the gasket surface;
    b. a support frame;
    c. a first support frame rail and a second support frame rail, with the first support frame rail parallel to the second support frame rail;
    d. a support frame actuator mounted to the support frame;
    e. a bridge frame;
    f. a first bridge rail and a second bridge rail, the first bridge rail parallel to the second bridge rail, with the first bridge rail and the second bridge rail mounted on a first side of the bridge frame;
    g. a spindle holder mounted to the bridge frame;
    h. a bridge frame actuator mounted to the bridge frame, wherein the bridge frame actuator moves the spindle holder along the first and second bridge rails at a 90 degree angle to the first and second support frame rails;
    i. a pneumatic spindle comprising a calibration head and a cutting head, wherein the pneumatic spindle is removably mounted in the spindle holder and is connected to a pneumatic air supply providing operational air pressure; and
    j. a portable controller in communication with the support frame actuator, the bridge frame actuator, a network, and a power supply, wherein the portable controller comprises:
        (i) a portable controller processor;
        (ii) a portable controller display in communication with the portable controller processor; and
        (iii) a portable controller data storage in communication with the portable controller processor, wherein the portable controller data storage comprise:
            (1) a library of gasket sizes to identify a size of a gasket;
            (2) computer instructions in the portable controller data storage to instruct the portable controller processor to calibrate the pneumatic spindle prior to cutting the gasket surface;
            (3) computer instructions in the portable controller data storage to instruct the portable controller processor to operate the pneumatic spindle to cut the gasket surface after calibration; and
            (4) computer instructions in the portable controller data storage to instruct the portable controller processor to enable a client device connected to the network to control the blowout preventer milling assembly from a remote location; and
        wherein the portable controller controls movement of the pneumatic spindle by using the support frame actuator to control movement on an x-axis and using the bridge frame actuator to control movement of the pneumatic spindle on a y-axis.

2. The blowout preventer milling assembly of claim 1, wherein the support frame comprises a first spring loaded mounting assembly for the first leg and a second spring loaded mounting assembly for the second leg.

3. The blowout preventer milling assembly of claim 1, wherein the portable controller is connected to the network for communicating between a client device with a client device display and a client device input device and a multiport motor drive in the portable controller.

4. The blowout preventer milling assembly of claim 1, wherein the portable controller further comprises:
    a. a closable housing;
    b. a power supply inlet connected to the portable controller processor;
    c. a support frame actuator output connected to the portable controller processor for transmitting signals to the support frame actuator controlling x-axis movement;
    d. a support frame actuator input configured to receive signals from the support frame actuator;
    e. a bridge frame actuator output connected to the portable controller processor for transmitting signals to the bridge frame actuator controlling y-axis movement; and
    f. a bridge frame actuator input receiving signals from the bridge frame actuator by the portable controller processor.

5. The blowout preventer milling assembly of claim 1, wherein the portable controller further comprises an emergency stop button to terminate power from the power supply to shut off the portable controller processor.

6. The blowout preventer milling assembly of claim 1, wherein the support frame further comprises:
    a. a plurality of first support bearings, each first support bearing slidably engaging the first support frame rail;
    b. a plurality of second support bearings, each second support bearing slidably engaging the second support frame rail;
    c. a first carriage plate attached to the plurality of first support bearings; and
    d. a second carriage plate secured to the plurality of second support bearings; and
    e. a first bridge bearing engaging the first bridge rail; and
    f. a second bridge bearing engaging the second bridge rail.

7. The blowout preventer milling assembly of claim 1, wherein the cutting head is a fly cutter.

8. The blowout preventer milling assembly of claim 1, further comprising an internet connection in communication with the portable controller processor enabling control from a remote location of the blowout preventer milling assembly by a client device using the network.

9. The blowout preventer milling assembly of claim 1, further comprising a plurality of jack screws, wherein at least two jack screws secure the first leg or the second leg to the blowout preventer.

10. The blowout preventer milling assembly of claim 1, wherein the pneumatic spindle comprises a graduated rotatable dial engaging a threaded body, wherein the calibration head or the cutting head installs on the threaded body.

11. The blowout preventer milling assembly of claim 1, wherein the support frame actuator comprises a ball screw will a ball nut for moving the bridge frame long the first and second support frame rails.

\* \* \* \* \*